(12) United States Patent
Goecke et al.

(10) Patent No.: US 9,340,455 B2
(45) Date of Patent: May 17, 2016

(54) METHOD AND SYSTEM FOR THE PRODUCTION OF HARD PLASTER

(75) Inventors: Volker Goecke, Ahlerstedt (DE); Tobias Gehle, Hammah (DE)

(73) Assignee: Claudius Peters Projects GmbH, Buxtehude (DE)

( * ) Notice: Subject to any disclaimer, the term of this patent is extended or adjusted under 35 U.S.C. 154(b) by 1320 days.

(21) Appl. No.: 13/063,719

(22) PCT Filed: Sep. 11, 2009

(86) PCT No.: PCT/EP2009/006621
§ 371 (c)(1),
(2), (4) Date: Mar. 11, 2011

(87) PCT Pub. No.: WO2010/028847
PCT Pub. Date: Mar. 18, 2010

(65) Prior Publication Data
US 2011/0168061 A1    Jul. 14, 2011

(30) Foreign Application Priority Data
Sep. 11, 2008    (EP) ..................... 08016047

(51) Int. Cl.
| | | |
|---|---|---|
| C04B 28/14 | (2006.01) |
| B01J 19/00 | (2006.01) |
| C04B 11/02 | (2006.01) |
| C04B 7/04 | (2006.01) |
| C04B 11/024 | (2006.01) |

(Continued)

(52) U.S. Cl.
CPC ..................... C04B 11/007 (2013.01)

(58) Field of Classification Search
None
See application file for complete search history.

(56) References Cited

U.S. PATENT DOCUMENTS 2,907,667 A * 10/1959 Johnson ............... C01F 11/466
                                                  106/778
3,915,927 A * 10/1975 Jaunarajs ............... C04B 11/02
                                                  524/423

(Continued)

FOREIGN PATENT DOCUMENTS

| DE | 20 49 028 | 4/1971 |
| DE | 1 771 625 | 1/1972 |

(Continued)

OTHER PUBLICATIONS

International Search Report mailed Dec. 17, 2009, directed towards counterpart Application No. PCT/EP2009/006621; 3 pages.

*Primary Examiner* — Gregory Huson
*Assistant Examiner* — Eric Gorman
(74) *Attorney, Agent, or Firm* — Morrison & Foerster LLP

(57) ABSTRACT

A method for the production of hard plaster, a calcining plant, and a retrofit reactor for calcining plants. The method includes feeding plaster material, predominantly including beta-hemihydrate plaster, to a postreactor. The temperature is set to at least a calcining temperature of 95° C. during this step. The plaster material is retreated in the postreactor to form hard plaster, the beta-hemihydrate plaster being converted directly into alpha-hemihydrate plaster at a temperature above 95° C. The hard plaster can then be discharged out of the postreactor and cooled. Conversion can be carried out in the postreactor during continuous operation, and conversion of the beta-hemihydrate plaster can occur with a dwell time in the postreactor of less than 30 minutes. Steam can be externally supplied to the postreactor and the temperature and pressure in the postreactor can be regulated so that the temperature is at least 95° C. and an over pressure prevails.

17 Claims, 2 Drawing Sheets

(51) Int. Cl.
*C04B 11/032* (2006.01)
*C04B 11/00* (2006.01)

(56) References Cited

U.S. PATENT DOCUMENTS

| | | | | |
|---|---|---|---|---|
| 3,945,841 A | * | 3/1976 | Dumont | 106/786 |
| 3,956,456 A | * | 5/1976 | Keller et al. | 423/171 |
| 3,977,890 A | * | 8/1976 | Jaunarajs | C04B 11/02 |
| | | | | 106/711 |
| 4,029,512 A | * | 6/1977 | Jaunarajs | C01B 25/41 |
| | | | | 106/775 |
| 4,086,099 A | * | 4/1978 | Prudhon et al. | 106/775 |
| 4,091,080 A | * | 5/1978 | Kosugi | C01F 11/466 |
| | | | | 23/300 |
| 4,234,345 A | * | 11/1980 | Fassle | 106/784 |
| 4,247,518 A | * | 1/1981 | Charlet et al. | 422/142 |
| 4,842,842 A | * | 6/1989 | Kudo | B01D 53/501 |
| | | | | 423/172 |
| 4,965,031 A | * | 10/1990 | Conroy | 264/122 |
| 5,015,449 A | | 5/1991 | Koslowski | |
| 5,041,333 A | * | 8/1991 | Conroy | 428/312.4 |
| 5,248,487 A | * | 9/1993 | Bold et al. | 423/171 |
| 5,320,677 A | * | 6/1994 | Baig | 106/780 |
| 5,437,850 A | * | 8/1995 | Kroehl et al. | 423/171 |
| 6,030,636 A | | 2/2000 | Randolph et al. | |
| 6,319,312 B1 | * | 11/2001 | Luongo | 106/675 |
| 6,342,284 B1 | * | 1/2002 | Yu et al. | 428/70 |
| 6,747,173 B2 | * | 6/2004 | Gerkema | C01F 11/46 |
| | | | | 562/589 |
| 7,824,490 B2 | | 11/2010 | Bruce et al. | |
| 2003/0061972 A1 | * | 4/2003 | Key, Jr. | 106/772 |
| 2004/0092625 A1 | * | 5/2004 | Pollock et al. | 524/42 |
| 2005/0152827 A1 | | 7/2005 | Bold | |
| 2005/0161853 A1 | * | 7/2005 | Miller | C04B 11/024 |
| | | | | 264/109 |
| 2006/0231466 A1 | * | 10/2006 | Nuber | B01J 8/0055 |
| | | | | 209/11 |
| 2008/0069762 A1 | * | 3/2008 | Lynn et al. | 423/555 |
| 2008/0073808 A1 | * | 3/2008 | Miller | B28B 5/027 |
| | | | | 264/86 |
| 2008/0152559 A1 | | 6/2008 | Bolind et al. | |
| 2008/0202415 A1 | * | 8/2008 | Miller | B01F 3/1221 |
| | | | | 118/708 |
| 2008/0229981 A1 | * | 9/2008 | Liu | C04B 28/146 |
| | | | | 106/778 |
| 2009/0047545 A1 | * | 2/2009 | Yu et al. | 428/703 |
| 2009/0101741 A1 | * | 4/2009 | Gocke | 241/275 |
| 2009/0159173 A1 | * | 6/2009 | Skinner | C04B 28/141 |
| | | | | 156/42 |
| 2009/0208392 A1 | * | 8/2009 | Klus | C04B 11/032 |
| | | | | 423/171 |
| 2009/0257946 A1 | * | 10/2009 | Luan | C04B 11/0283 |
| | | | | 423/555 |
| 2009/0293772 A1 | * | 12/2009 | Dumoulin et al. | 106/776 |
| 2010/0135865 A1 | * | 6/2010 | Constantz et al. | 422/170 |
| 2010/0178624 A1 | * | 7/2010 | Srinivasachar | 431/253 |
| 2011/0150750 A1 | * | 6/2011 | Goecke et al. | 423/555 |
| 2012/0037045 A1 | * | 2/2012 | Fonollosa | C04B 28/04 |
| | | | | 106/709 |
| 2014/0377162 A1 | * | 12/2014 | Mongrolle et al. | 423/555 |

FOREIGN PATENT DOCUMENTS

| | | |
|---|---|---|
| DE | 38 16 513 | 12/1988 |
| DE | 38 19 652 | 12/1988 |
| DE | 37 38 301 | 5/1989 |
| EP | 0 572 781 | 12/1993 |
| WO | WO-2008/074137 | 6/2008 |

* cited by examiner

METHOD AND SYSTEM FOR THE PRODUCTION OF HARD PLASTER

REFERENCE TO RELATED APPLICATIONS

This application is a national stage application under 35 USC 371 of International Application No. PCT/EP2009/006621, filed Sep. 11, 2009, which claims the priority of European Patent Application No. 08016047.6, filed Sep. 11, 2008, the contents of which prior applications are incorporated herein by reference.

FIELD OF THE INVENTION

The invention relates to a method for the production of hard plaster from burnt beta-hemihydrate. It comprises a feed of the burnt plaster material, composed predominantly of beta-hemihydrate, to a postreactor, posttreatment in the postreactor, the beta-hemihydrate being converted directly into alpha-hemihydrate, and discharge of the hard plaster, along with subsequent cooling.

BACKGROUND OF THE INVENTION

Conventionally, hard plaster is produced from raw plaster (dihydrates). Various methods are known for this purpose. A first method operates with aqueous plaster suspensions which are treated in an autoclave at temperatures of 105° C. to 165° C. and with an overpressure of easily 1 to 6 bar. There is also a pressureless method in which a plaster suspension in sulfuric acid is converted by means of other acids at temperatures of below 105° C. Moreover, there are also what are known as quasi-dry methods (DE-A-3819652, DE-A-3819653, EP-A-0572781), in which dehydrated plaster having a relatively low residual moisture of less than 20% is converted in autoclaves at temperatures between 105° C. and 165° C. and with an overpressure of 1 to 6 bar. What all these methods have in common is that the raw material (dihydrate) is converted directly into hard plaster (alpha-hemihydrate), wherein aggregates may be required where appropriate, such as, for example, a 5% fraction of beta-hemihydrate, also being required, where appropriate. What the methods also have in common is that they are complicated and entail high costs both in terms of energy and in terms of the materials used (acids).

Conventionally, hard plaster is produced from raw plaster (dihydrates). Various methods are known for this purpose. A first method operates with aqueous plaster suspensions which are treated in an autoclave at temperatures of 105° C. to 165° C. and with an overpressure of easily 1 to 6 bar. There is also a pressureless method in which a plaster suspension in sulfuric acid is converted by means of other acids at temperatures of below 105° C. Moreover, there are also what are known as quasi-dry methods (DE-A-3819652, DE-A-3819653, EP-A0572781), in which dehydrated plaster having a relatively low residual moisture of less than 20% is converted in autoclaves at temperatures between 105° C. and 165° C. and with an overpressure of 1 to 6 bar. What all these methods have in common is that the raw material (dihydrate) is converted directly into hard plaster (alpha-hemihydrate), aggregates, such as, for example, a 5% fraction of beta-hemihydrate, also being required, where appropriate. What the methods also have in common is that they are complicated and entail high costs both in terms of energy and in terms of the materials used (acids).

Further, a method is known in which beta-plaster is subjected to artificial aging within the framework of posttreatment, in order to increase mechanical pressure resistance (DE-B1771625). The method provides first for calcining into conventional stucco plaster (beta-plaster), alpha-hemihydrate being partially generated from the beta-hemihydrate in the subsequent process. In order to achieve this, water is added during posttreatment, specifically in a sufficient amount to lower the temperature of the suspension in a range below the calcining temperature. Rehydration of the beta-hemihydrate into dihydrate is thereby set in motion. Subsequently, the cooled plaster is heated again to a temperature above the calcining temperature, so that, from the dihydrate rehydrated by cooling, hemihydrate is formed once again, specifically in the alpha modification. One disadvantage of this method is that that fraction of the alpha modification which is achieved is not very high, and therefore it has only low efficiency, and, moreover, the product still has relatively high BET ("Brunauer-Emmett-Teller") values which are considerably above those of conventional hard plaster.

For the selective production of beta or alpha plaster, a method is known (DE-A-3738301) in which the dihydrate is acted upon in a calciner with hot fluidizing gas. Whether beta plaster or alpha plaster is formed is controlled by setting the temperature and pressure. For alpha plaster, temperatures of above 250° C. are required in the calciner, with a pressure of 2 to 6 bar. The method consequently resembles the known use of autoclaves and shares their disadvantages. Also, purity in terms of the fraction of alpha modification is only unsatisfactory.

A multistage plant for calcining is known from US 2008152559. A plurality of the reactors are connected in series in order to burn the plaster material in batches to form anhydrite. Hot steam can be supplied for heating purposes. The reactors can be provided with integrated grinding plants in order to grind the anhydrite into as uniform a small particle size as possible. The plant is designed for temperatures of above 550° C. and pressures of 70 bar. The anhydritic ("deadburnt") alpha plaster thus generated does not have the advantageous properties of alpha-hemihydrate plaster.

Finally, a method for the production of alpha plaster is known, in which beta plaster is converted directly into alpha plaster (DE-A-2049028). For this purpose, briquets composed of beta plaster mixed with water are converted in an autoclave into alpha plaster over several hours, the addition of aggregates being provided.

SUMMARY OF THE INVENTION

The object on which the invention is based is, proceeding from the prior art last mentioned, to specify an improved method and a corresponding plant which allow a more efficient production of hard plaster.

The solution according to the invention lies in the features broadly disclosed herein. Advantageous developments are the subject matter of the disclosure.

In a method for the production of hard plaster, comprising a feed of plaster material, composed predominantly of beta-hemihydrate plaster, to a postreactor, posttreatment in the postreactor to form hard plaster, the beta-hemihydrate plaster being converted directly into alpha-hemihydrate plaster at a temperature of above the calcining temperature of 95° C., and discharge of the hard plaster, there is provision, according to the invention, for setting the temperature to at least the calcining temperature during the feed of the plaster material to the postreactor, for conversion in the postreactor with a dwell time of at most 30 minutes, while steam is being supplied, and for regulating the temperature and pressure in the postreactor in such a way that the temperature amounts to at least 95° C. and an overpressure prevails.

Some terms will first be defined. The calcining temperature is the temperature from which the dihydrate is converted into hemihydrate in the plaster. It amounts to about 95° C. in the case of customary calcium sulfate plaster. The term composed "predominantly" is understood to mean a minimum fraction of 50%, preferably of 90% and, further preferably, of 95%, while even 100% or technical purity is also to be covered.

The essence of the invention lies in the idea of achieving direct conversion of beta-hemihydrate in alpha-hemihydrate by means of the steps claimed, without a detour via rehydration into dihydrate in this case being adopted.

The invention makes use of the fact that rehydration into dihydrate is reliably prevented by setting the temperature during the feed of the burnt beta plaster to the postreactor to a value above the calcining temperature. The invention recognized, further, that this affords the possibility of converting the hot beta-hemihydrate plaster (that is to say, having at least the calcining temperature) directly into hard plaster in a hot and humid atmosphere under overpressure conditions, in that steam is added externally. The moisture thus introduced satisfies the water demand of the beta plaster, so that, in the interaction with the high temperature and the overpressure, crystal defects are healed, until finally, after a dwell time of at most 30 minutes, the alpha crystal structure, advantageous in terms of its mechanical properties, is obtained from the beta crystal structure. This gives rise to hard plaster with a water/plaster value which is appreciably lower than that of beta plaster and consequently results in a considerable increase in mechanical resistance. Production avoids the need for the time-consuming and energy-intensive use of autoclaves which require dwell times of several hours and are therefore not only complicated, but also make it virtually impossible to operate continuously. The invention, with its method and its short dwell time, not only allows a considerable reduction in the expenditure of time and energy, but makes it possible to have the direct conversion, advantageous in terms of its properties, of beta plaster into alpha plaster by virtue of short dwell times, even during continuous operation.

A further advantage of the invention is that no aggregate materials are required, and therefore the invention can be carried out without the need for aggregate materials.

The method is distinguished, further, in that it is robust in terms of the initial material. In particular, instead of natural plaster, synthetic plaster occurring in large quantities, particularly from flue gas desulfurization plants, or else phosphorus plaster, such as occurs in the production of phosphoric acid, may also be used. Since it is precisely the last-mentioned types which occur in large quantities and their disposal has hitherto entailed not inconsiderable costs, the method according to the invention affords new opportunities of providing hard plaster, as a valuable building material, from these.

Preferably, the overpressure under which posttreatment takes place in the postreactor, lies at an absolute pressure of at least 1.5 bar, preferably between 1.6 bar and 2 bar. This pressure range has proved to be especially beneficial for the direct conversion of beta-hemihydrate into alpha-hemihydrate and requires only a low outlay in terms of the pressure resistance of the components, as compared with the conventional autoclave methods which operate at pressures of up to 6 bar. Expediently, there is provision whereby the stock to be posttreated is introduced into the postreactor and discharged from it by means of pressure locks for more efficient continuous operation.

The temperature in the postreactor preferably lies below 150° C. A proven temperature range lies between 120° C. and 140° C.

The method according to the invention is robust in terms of the quality of the beta plaster supplied. Thus, it does not need to be calcined completely, but may even be only precalcined, as occurs particularly in flash calcining.

Expediently, posttreatment with a posttreatment time of at least 10 minutes, further preferably at least 15 minutes, is provided. As a result, even only partially calcined plaster can be reliably processed into the desired hard plaster.

According to a preferred embodiment, mechanical agitation of the stock in the postreactor is provided, for example by homogenization. This is understood to mean the treatment of the stock by means of turbo mixers. Efficient comminution of the crystals is thereby achieved, so that the Blaine values for the surface can be lowered in the desired way. In addition, postcomminution can take place in a process following the postreactor. In particular, this may take place before the cooling of the hard plaster, but even thereafter, where appropriate. Especially good results are achieved by homogenization in the postreactor itself, specifically also, in particular, when synthetic plasters are used as raw material.

During posttreatment, further, full mixing can be improved by feeding fluidizing gas into the postreactor. Caking or the formation of dead zones in the postreactor can therefore be prevented, and more intensive full mixing and a more uniform temperature distribution in the postreactor are obtained. This leads to higher product quality. The fluidizing gas is preferably hot.

System exhaust gas may be used for this purpose, such as occurs particularly when the initial material is being burnt into beta-hemihydrate plaster. Advantageously, the method according to the invention is preceded by pretreatment in which dihydrate plaster is used as initial material and is calcined to form plaster material having predominantly beta-hemihydrate. The system exhaust gas which in this case occurs can be fed to the postreactor, specifically as fluidizing gas or as hot steam. This applies especially when the burner used is a calcining mill. This exhaust gas is very moist (moisture content of about 35%) and hot (temperature of at least 150° C.). If required, however, water or steam may also additionally be supplied. In this case, to form the steam, a heat exchanger may be provided, through which the system exhaust gas is routed and thus generates the steam for the postreactor.

Proven parameters for the method are a temperature in the postreactor 3 of between 120° C. and 140° C. and a pressure of 1.65 to 1.85 bar. Pretreatment is carried out until, after a dwell time of between 10 and 30 minutes, a specific surface (BET) of at most 4 $m^2/g$ and/or a water/plaster value of appreciably lower than 0.6, preferably lower than 0.5, are achieved.

Finally, it may also be noted that a substantial benefit of the method is that it can be carried out under dry conditions, with the exception of the feed of steam to the postreactor. This aspect makes it possible to have good energy efficiency and, together with the feed of steam during posttreatment, high product quality.

The invention extends, further, to a plant for carrying out the method described above. The plant comprises a burner for the calcining of dihydrate plaster as initial material and a separate postreactor lying downstream in the direction of run of the process, said burner and said postreactor being connected via transport means for the calcined beta plaster, according to the invention the transport means being designed in thermal terms such that calcined beta plaster having a temperature of at least 95° C. is fed to the postreactor, the postreactor having at least one further connection for feeding heat and moisture externally, and a control device being provided which interacts with a steam circuit in such a way as to set a dwell time in the postreactor of at most 30 minutes at a temperature of above 95° C. and with overpressure.

A corresponding retrofit reactor is likewise the subject of the invention.

BRIEF DESCRIPTION OF THE DRAWINGS

The invention is explained below with reference to the accompanying drawings, which illustrate an advantageous exemplary embodiment and in which.

DETAILED DESCRIPTION OF THE INVENTION

Figure 1:
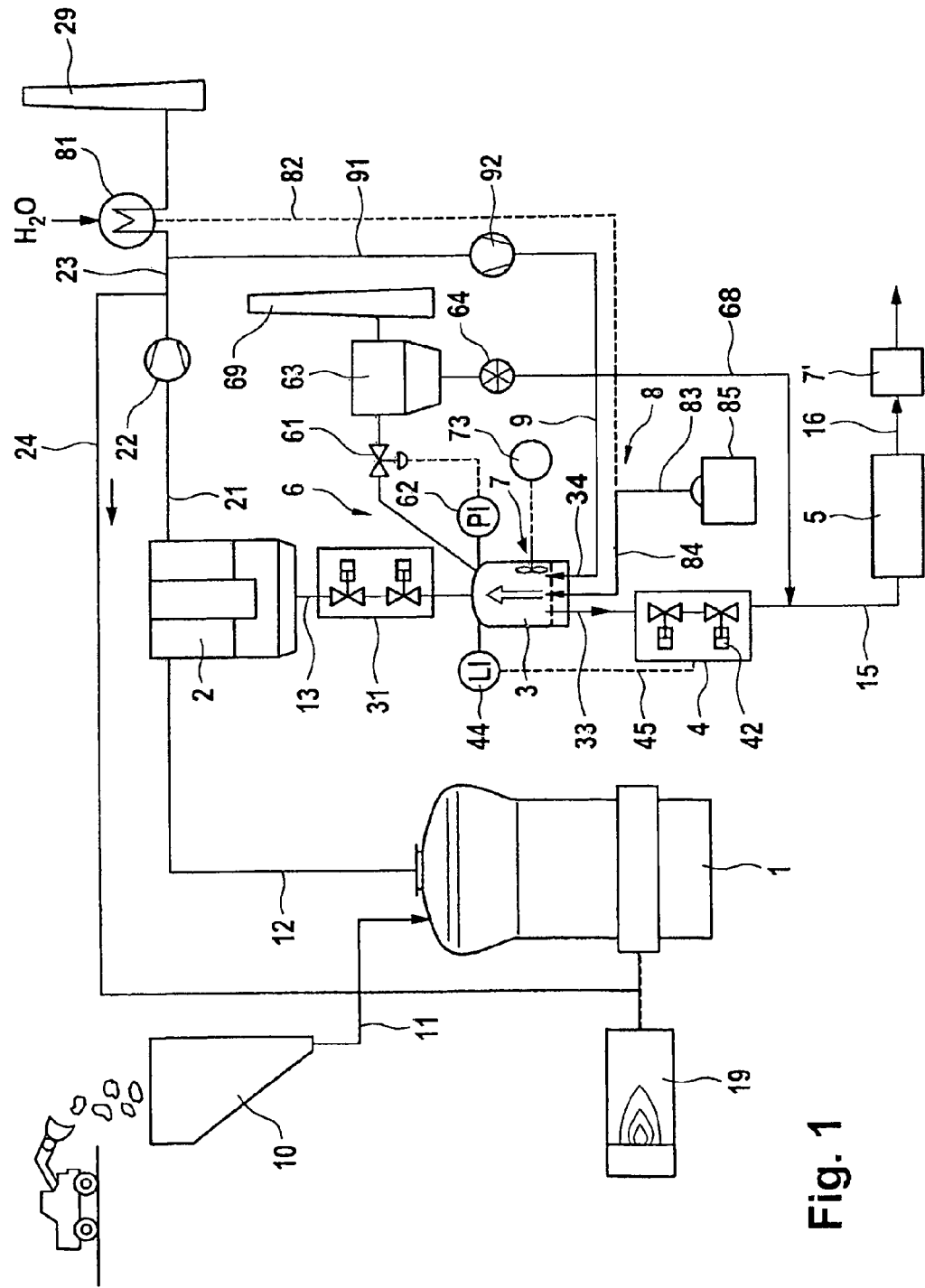
FIG. 1 shows an illustration of an exemplary embodiment of a calcining plant in the form of a diagrammatic overview.

The invention will be explained on the basis of an exemplary embodiment of a plant in which calcined stucco plaster is processed further into hard plaster by means of a calcining mill.

Raw material for the stock to be calcined is introduced into the calcining plant at a delivery point 10. The raw material may be natural crude plaster or synthetic plasters may be used. Raw material passes from the delivery point 10 via a line 11 to the inlet connection of a calcining mill 1. The calcining mill 1 is preferably designed as a flash calciner. It comprises devices for comminuting and calcining the raw material. In order to achieve the high temperature of about 150° C. to 160° C. necessary for flash calcining, a hot-gas generator 19 is connected to the calcining mill 1. A dwell time of 10 seconds is usually sufficient for flash calcining. It should be noted that, per se, any other procedure for calcining the raw material may also be provided. After calcining, the plaster leaves the calcining mill 1 via a discharge line 12. The calcined plaster (stucco plaster) has a crystalline form which is designated as a beta modification. The plaster is therefore also known by the designation of beta-hemihydrate plaster.

The stucco plaster is fed via the line 12 to a gas/plaster separator 2. This separates the calcined plaster from the system exhaust gas which has escaped from the calcining mill 1 into the line 12. The system exhaust gas is routed via an exhaust gas line 21, a pressure increasing stage 22 and a line 23 to an exhaust air chimney 29. Further, the line 23 has connected to it a return line 24, via which part of the hot system exhaust gas is recirculated into the calcining mill 1. Furthermore, the separator 2 has at its bottom an outlet for the calcined plaster. The latter is fed via a line 13 and an inlet lock 31 to a postreactor 3. The lines 12, 13 are designed as thermal piping for setting the temperature of the plaster to at least 95° C. The temperature setting can be carried out actively by heating or passively by correspondingly selected insulation. It may be noted that the temperature of the calcined plaster, as it emerges from the separator 2 and enters the postreactor 3, has been reduced only slightly and mostly still amounts to about 150° C. In an alternative embodiment of the invention, for which, where appropriate, independent protection is to be claimed, the thermal piping is dispensed with and the plaster is fed at any desired temperature to the postreactor.

The postreactor 3 is designed as a pressure reactor. For this purpose, the inlet locks 31 are provided, through which the calcined plaster fed via the line 13 passes into the postreactor 3. The inlet lock 31 is provided for this purpose with 2 slide devices which are actuated alternately. An overpressure of about 0.5 bar prevails in the postreactor 3; it is also possible to provide lower or higher overpressures, in particular in the range of up to 1 bar. In the postreactor 3, the stucco plaster, which is present with crystals in what is known as the beta modification, is directly recrystallized under overpressure and with a supply of steam into a crystalline form according to an alpha modification. What is critical here is a combination of overpressure, of a temperature which lies at least above the calcining temperature of dihydrate (90° C. to 95° C.) and of the presence of enriched moisture, in particular due to the supply of steam. According to the invention, therefore, the direct recrystallization of the plaster from the beta modification to the alpha modification takes place. The formation of the crystals is in this case completed, imperfections in the crystals being closed (healed). In this case, the BET surface diminishes to values of less than 4 $m^2/g$, the water/plaster value falling to values appreciably lower than 0.6, for example to a value of 0.4. This recrystallization into crystals according to the alpha modification achieves a considerable increase in the strength of the plaster product. Hard plaster is obtained. A temperature in the postreactor 3 of between 120° C. and 140° C. and a pressure of 1.65 to 1.85 bar have proved especially appropriate.

The plaster thus produced with alpha modification (hard plaster) leaves the postreactor 3 via the outlet connection 33 and an outlet lock 42. The outlet lock 42 forms part of a quantity regulating system 4 which regulates the quantity of hard plaster to be locked out. Furthermore, both the filling level in the postreactor 3 and the dwell time and therefore the conversion process in the postreactor 3 can be controlled. For this purpose, the quantity regulating system 4 has a filling level sensor 46 which is arranged in the postreactor 3. The sensor 46 may be designed in a way known per se as a radar altimeter. It transmits its signal to a quantity controller 44 on which parameters relating to a desired filling height and the desired dwell time can be set as command variables. The quantity controller 44, as a function of the value measured by the sensor 46, transmits control signals which are applied via an output line 45 to the slides of the outlet lock 42.

Downstream of the outlet lock 42, the still hot hard plaster is transported via a line 15 to an in-feed end of a rotary tube cooler 5. The hard plaster is cooled in this and is finally discharged via a line 16.

Figure 2:
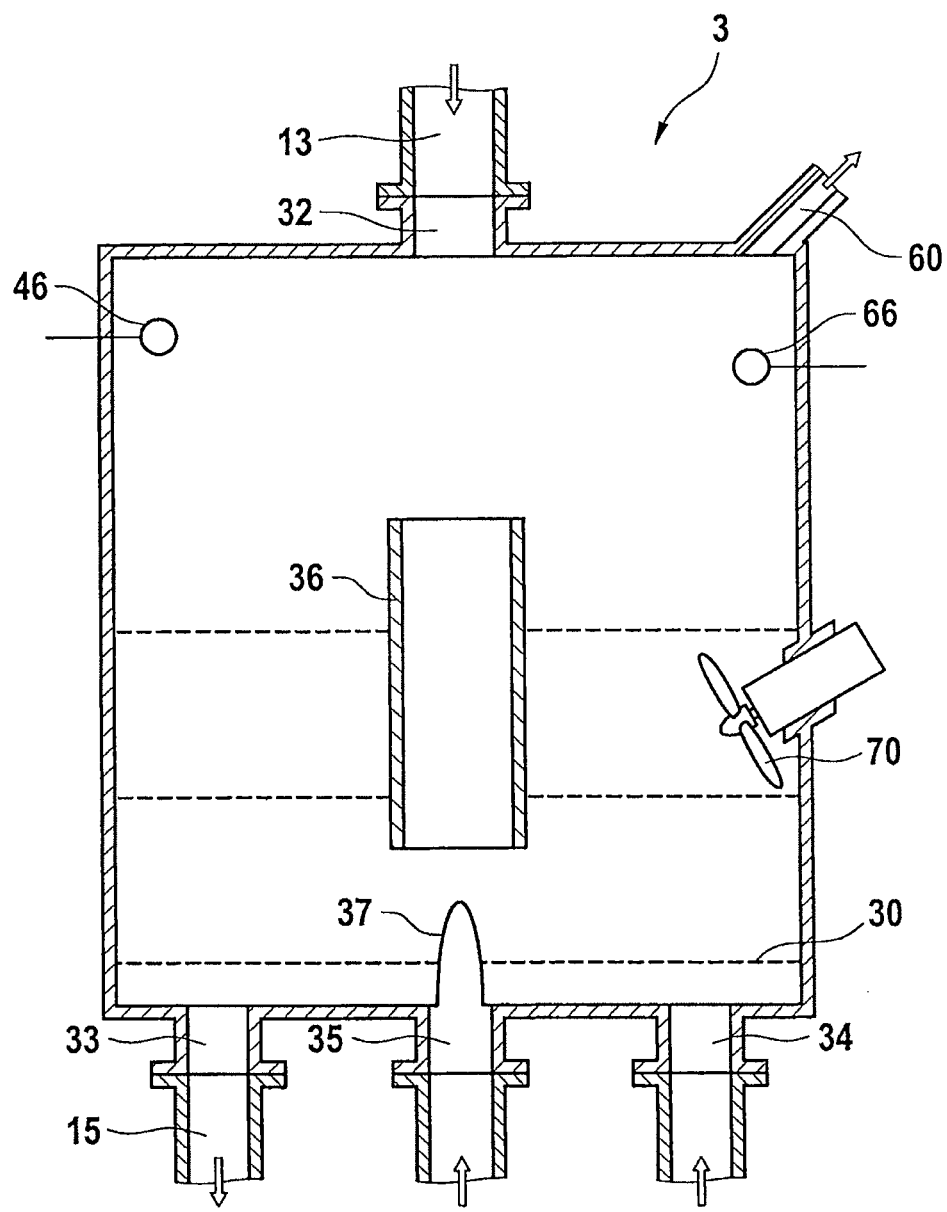
FIG. 2 shows a sectional view of a postreactor of the calcining plant.

The postreactor 3, the systems interacting with it and its functioning will be explained in more detail below with reference to FIG. 2. The postreactor 3 has, apart from the inlet connection 32 and outlet connection 33 for the plaster to be recrystallized, an inlet connection 34 for fluidizing gas and also an inlet connection 35 for process gas. Further, inside the postreactor is arranged a fluidizing bottom 30. It comprises essentially a bottom with hollow chambers, arranged beneath it, for supplying the fluidizing gas which is supplied via the inlet connection 34. The fluidizing gas can emerge upward through orifices into the fluidizing bottom 30 and at the same time can flow through a layer, lying on the fluidizing bottom 30, of the plaster to be treated and at the same time fluidize it. Further, a riser pipe 36 running from below upward is provided in the middle of the working space of the postreactor 3. The riser pipe 36 is formed by a metallic pipe casing. It is arranged above the inlet connection 35 for process gas which issues in a nozzle 37. This nozzle is aligned coaxially with the center of the riser pipe 36. What is achieved thereby is that the process gas stream supplied via the inlet connection 35 is directed into the riser pipe 36. As a result, at the lower end of the riser pipe 36 where the process gas enters from the nozzle 37, the static pressure falls, with the result that particles are sucked in from the surroundings. They are entrained upward by the gas stream through the riser pipe 36 and are distributed at the upper end again over the inner space. A circulating movement is consequently formed which ensures good full mixing of the stock in the working space.

Further, a comminuting plant 7 may also be provided, which comprises the turbo mixer 70 introduced in the side wall of the postreactor 3. They are activated by a control device 73 such that comminution of the elongate crystalline structures of the beta modification plaster supplied takes place. The surface of action for converting the crystals into the alpha modification is consequently enlarged. Comminution is advantageous particularly in the processing of synthetic plasters as initial material which have ex-factory a markedly elongate crystalline form. In the exemplary embodiment illustrated, only one turbo mixer 70 is illustrated for the sake of clarity, but preferably a plurality of turbo mixers 70 distributed uniformly on the circumference are provided; where appropriate, this may also take place in a plurality of tiers.

The gas necessary for fluidization via the fluidizing bottom 30 can advantageously be obtained from the system exhaust gas of the calcining mill 1 which is fed into the line 23 from the separator 2. It can be removed from there via a tap line 91 and, after an increase in pressure, can be supplied by means of a gas pump 92 via a line 9 to the inlet connection 34 as fluidizing gas. Thus, by the hot and moist system exhaust gas being supplied, not only is fluidization of the stock in the postreactor 3 achieved, but a rise in pressure and in temperature is also ensured at the same time.

A control loop 6 is provided for regulating the pressure in the postreactor 3. Said control loop comprises a control unit 62 to which the signal measured by a pressure sensor 66 is applied. The control unit 62 determines an output signal which is applied to pressure regulating valve 61 for regulating the exhaust air routed out of the postreactor 3 via a line 60. The exhaust air discharged via the line 60 is applied to a dust separator 63. The exhaust air freed of dust is blown off via a smokestack 69. The collected dust is fed via a cellular wheel sluice 64 and a line 68 to the outlet line 15. The control unit 62 is designed for the purpose of setting the pressure in the postreactor 3 when the pressure regulating valve 61 is activated.

For the supply of steam, a heat exchanger 81 is provided which is located between the line 23 and the exhaust air chimney 29 for the system exhaust gas. Water supplied is heated in the heat exchanger 81 by means of this system exhaust gas and is fed via a line 82 to a steam circuit 8. The steam circuit 8 comprises a control unit 85 which monitors a mixing valve 83 for determining the quantity and, by admixing ambient air, also the temperature of the steam supplied. The gas mixture thus set is supplied via a line 84 to the inlet connection 35 for the process gas.

Consequently, via the individual systems, the pressure, humidity and temperature in the postreactor 3 can be checked. The conversion of the stucco plaster into hard plaster can consequently be carried out in the postreactor 3, only water and system exhaust gas needing to be supplied from preceding process stages, in particular the calcining mill 1; independent heating of the postreactor 3 is not required.

The comminuting plant 7 arranged at the postreactor 3, with the turbo mixer 70, may be supplemented or replaced by postcomminution. For this purpose, downstream of the outlet lock 42, a comminuting unit 7' is provided which may be arranged upstream or downstream of the rotary tube cooler 5.

This plant consequently makes it possible to carry out the method according to the invention, specifically in continuous operation and also (particularly when two postreactors 3 are provided) in batchwise operation. Thus, stucco plaster supplied, which has been generated by the calcining mill 1, for example by flash calcining, can be recrystallized directly into hard plaster, the beta modification of the hemihydrate crystals being converted directly into the alpha modification of the hemihydrate crystals, specifically without rehydration into dihydrate taking place in the meantime. The water/plaster value can consequently be lowered from initial values higher than 1 to values appreciably lower than 0.6, and the BET surface can be lowered from initial values of 10 $m^2$/g to values lower than 3 $m^2$/g.

The invention claimed is:

1. A method for the production of a hard plaster, comprising:
   feeding a plaster material, predominantly comprising a beta-hemihydrate plaster, to a postreactor, wherein a temperature is set to at least a calcining temperature of 95° C. during this step;
   posttreating the plaster material in the postreactor to form the hard plaster, the beta-hemihydrate plaster being converted directly into an alpha-hemihydrate plaster at a temperature above the calcining temperature of 95° C.;
   discharging the hard plaster out of the postreactor; and
   cooling the hard plaster,
   wherein conversion is carried out in the postreactor during continuous operation, conversion of the beta-hemihydrate plaster occurs with a dwell time in the postreactor of less than 30 minutes, steam is externally supplied to the postreactor, and a temperature and pressure in the postreactor are regulated so that the temperature is at least 95° C. and an overpressure prevails in the postreactor.

2. The method of claim 1, wherein the overpressure is set to an absolute pressure of at least 1.5 bar.

3. The method of claim 1, wherein the plaster material is introduced into the postreactor using a first pressure lock and is discharged from the postreactor using a second pressure lock.

4. The method of claim 1, wherein the dwell time in the postreactor is at least 10 minutes.

5. The method of claim 1, further comprising mechanically agitating the plaster material in the postreactor.

6. The method of claim 5, wherein the mechanical agitation is carried out by homogenization.

7. The method of claim 1, further comprising supplying hot fluidizing gas into the postreactor.

8. The method of claim 1, further comprising a pretreatment step in which a dihydrate plaster as a starting material is calcined into the plaster material predominantly comprising the beta-hemihydrate plaster.

9. The method of claim 8, further comprising supplying hot system exhaust gas from the calcining of the pretreatment step to the postreactor.

10. The method of claim 1, wherein the steam is heated via a heat exchanger heated by system exhaust gases.

11. The method of claim 1, wherein, during posttreatment in the postreactor, at least one of a specific Brunauer-Emmett-Teller surface of at most 4 $m^2$/g of the plaster material in the postreactor and a water/plaster value representing a ratio between the mass of the water and the mass of the plaster material of lower than 0.6 of the plaster material in the postreactor is achieved.

12. The method of claim 1, wherein the method is carried out under dry conditions except for the supply of the steam into the postreactor.

13. The method of claim 1, wherein the overpressure is set to an absolute pressure of at least 1.6 bar.

14. The method of claim 1, wherein the overpressure is set to an absolute pressure of at least 2 bar.

15. The method of claim 1, wherein the dwell time in the postreactor is at least 15 minutes.

16. The method of claim 6, wherein the homogenization is carried out using mixers arranged in the postreactor.

17. The method of claim 1, wherein, during posttreatment in the postreactor, at least one of a specific Brunauer-Emmett-Teller surface of at most 4 $m^2/g$ of the plaster material in the postreactor and a water/plaster value representing a ratio between the mass of the water and the mass of the plaster material of lower than 0.5 of the plaster material in the postreactor is achieved.

* * * * *